Nov. 6, 1962
T. C. McGOW ETAL
3,062,359
ACCUMULATOR CONVEYOR
Filed Feb. 25, 1959
6 Sheets-Sheet 1
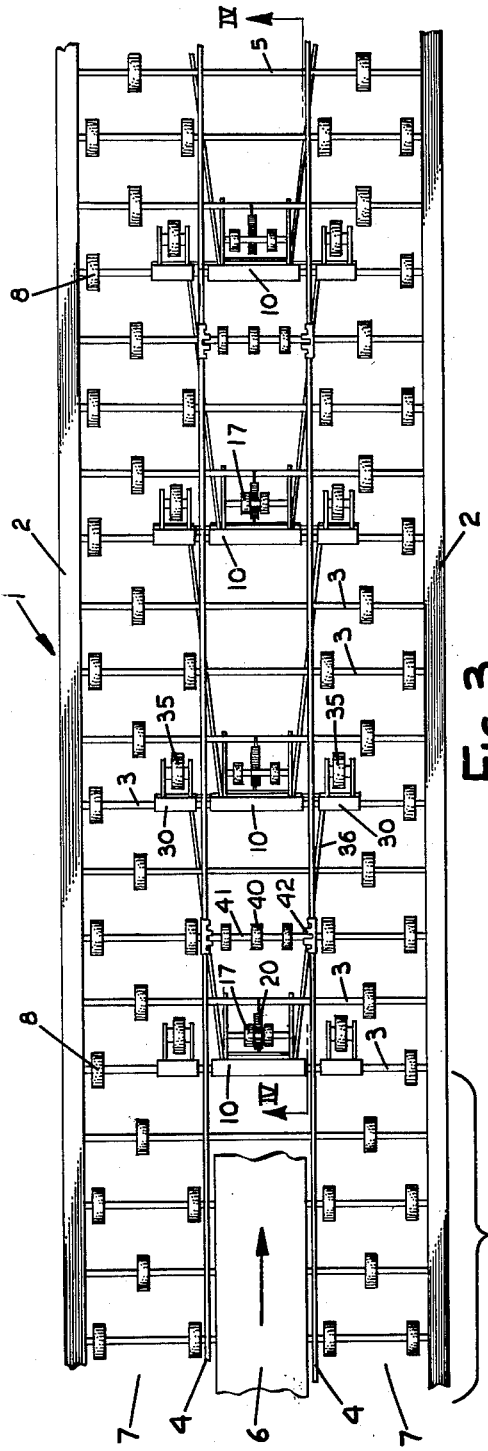
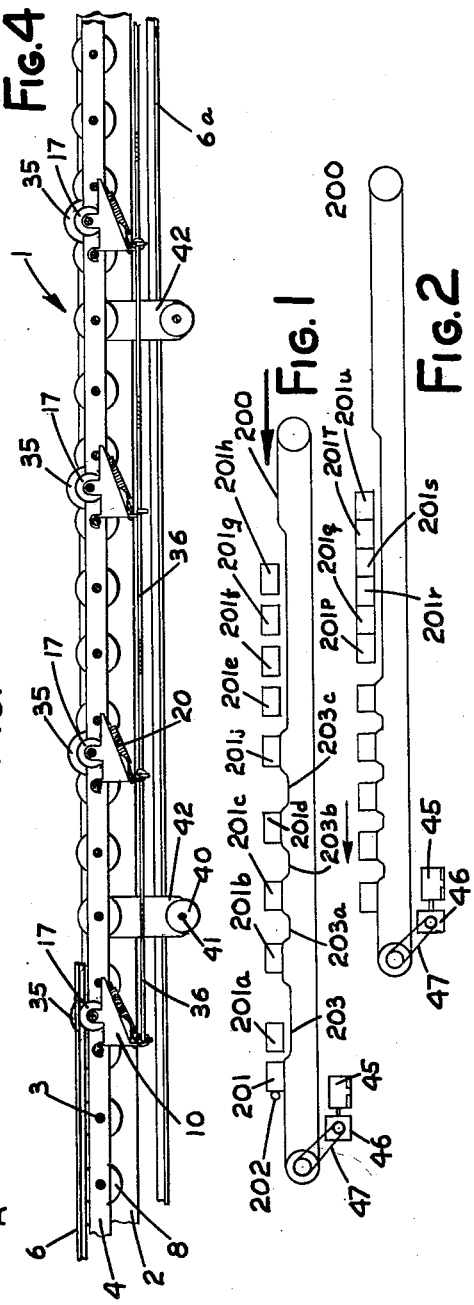
INVENTORS
THOMAS C. McGOW
NORMAN C. POEL
BY HOWARD A. OLK
ATTORNEYS INVENTOR.
THOMAS C. McGOW
NORMAN C. POEL
BY HOWARD A. OLK

ATTORNEYS

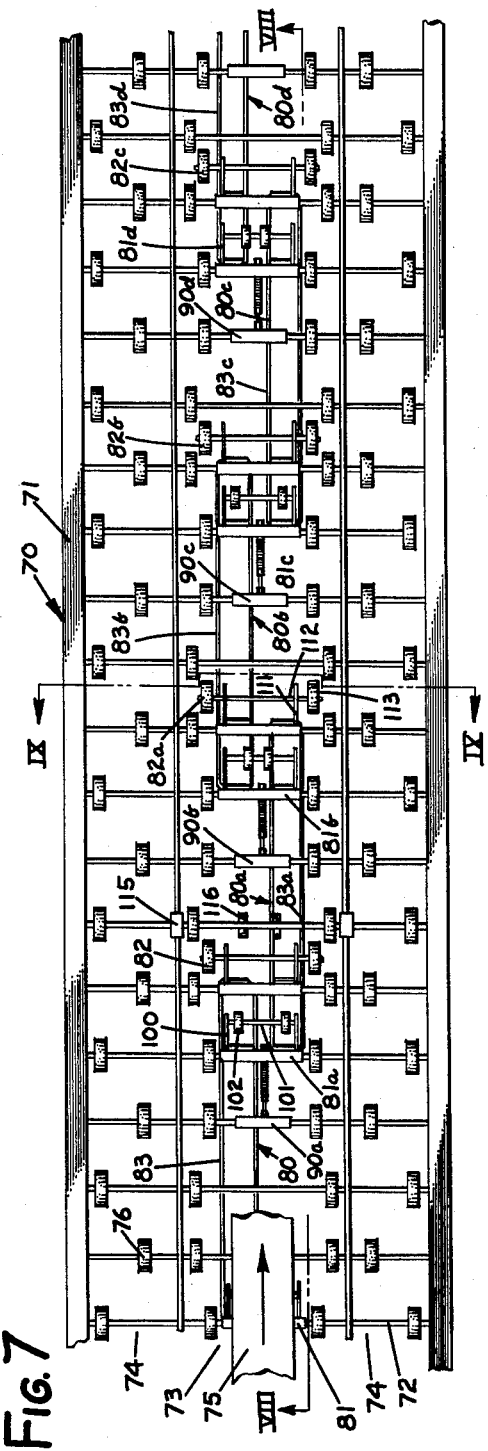
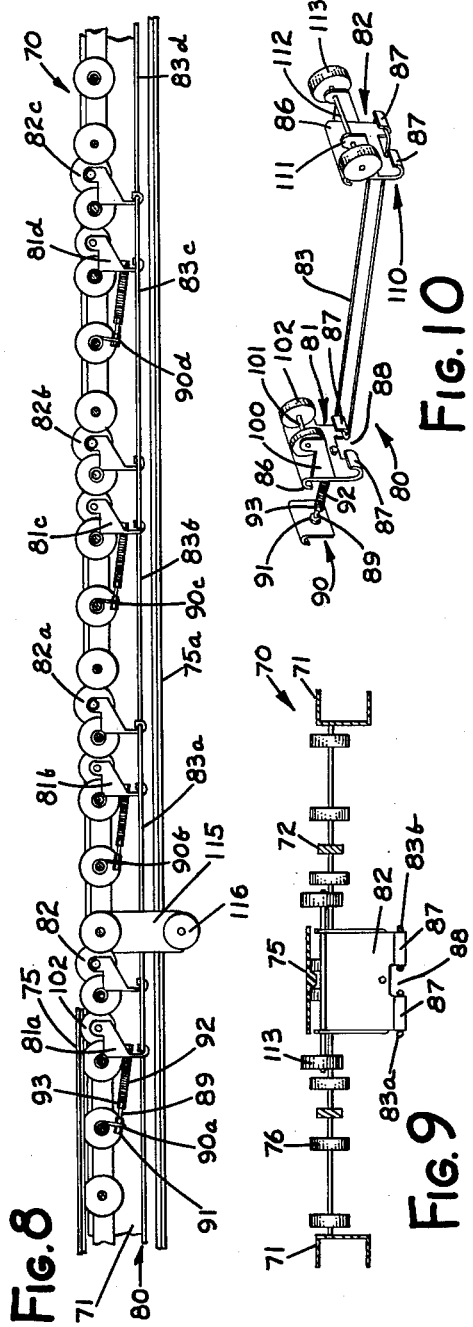

Nov. 6, 1962  T. C. McGOW ETAL  3,062,359
ACCUMULATOR CONVEYOR
Filed Feb. 25, 1959  6 Sheets-Sheet 4
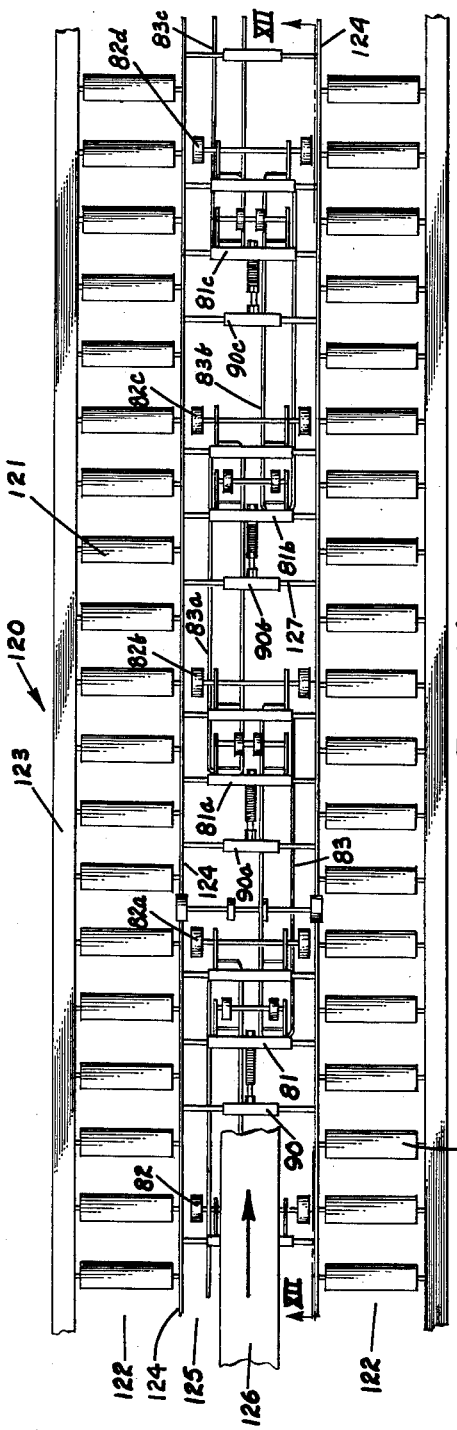
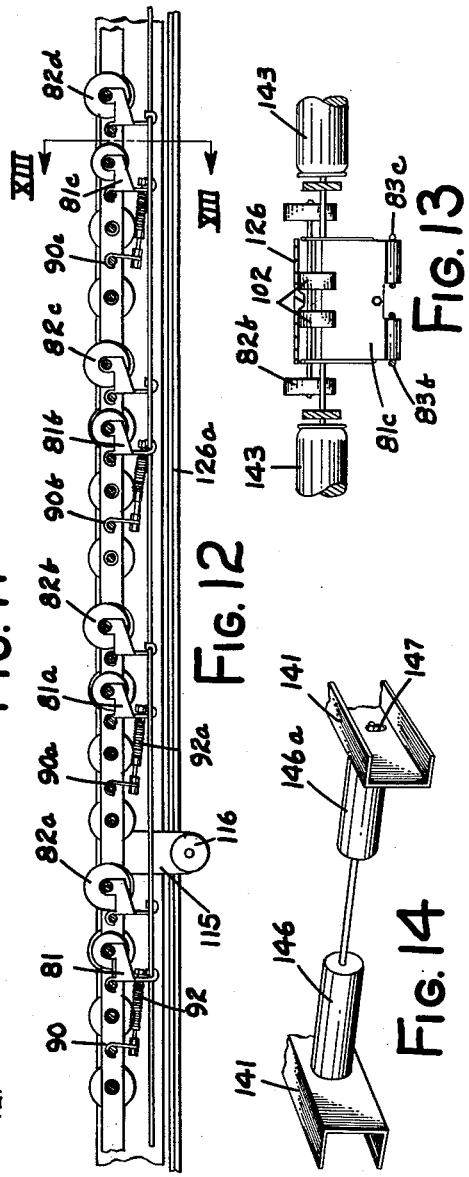
INVENTOR.
THOMAS C. McGOW
NORMAN C. POEL
BY HOWARD A. OLK
ATTORNEYS

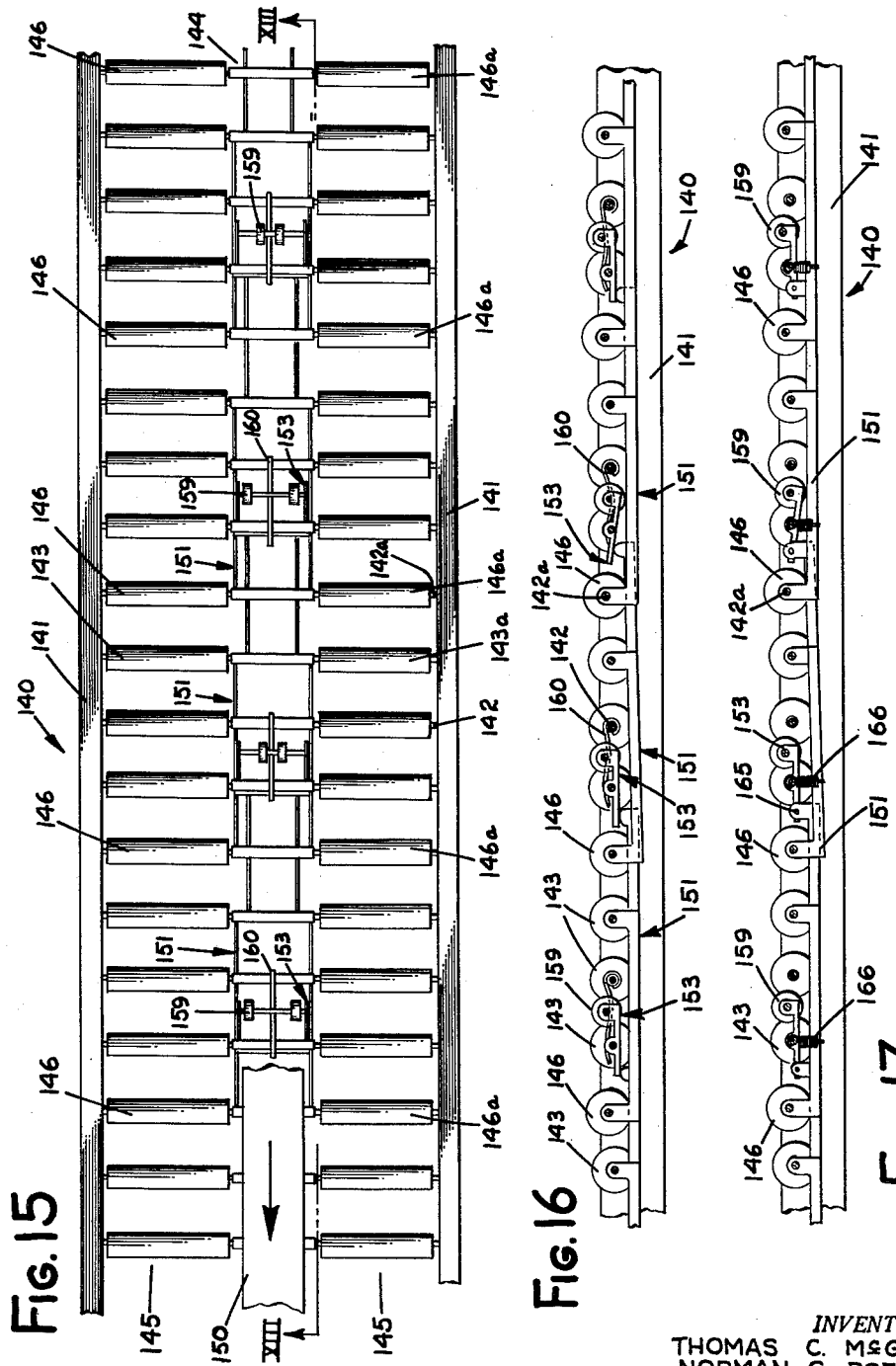

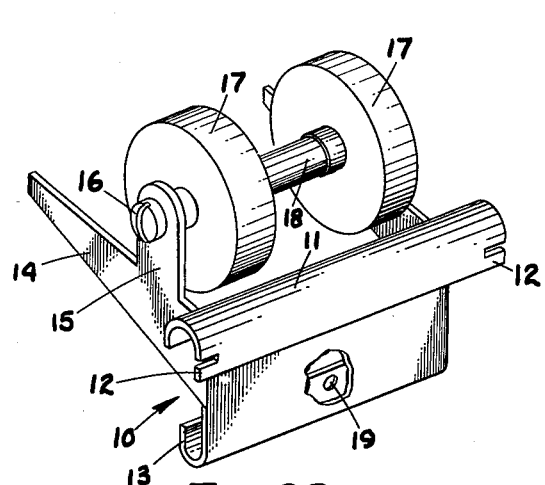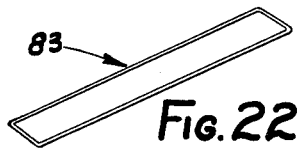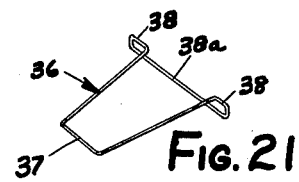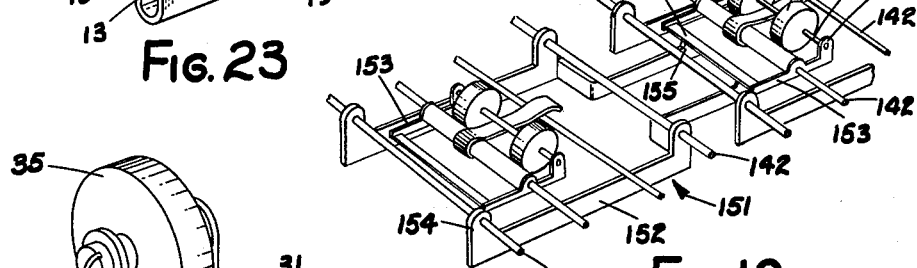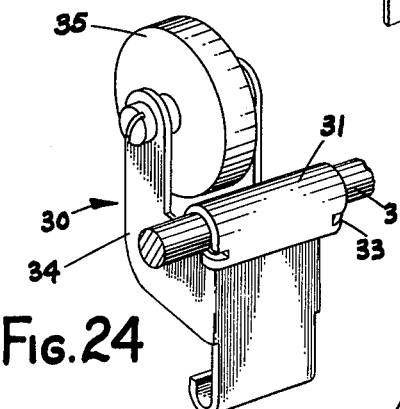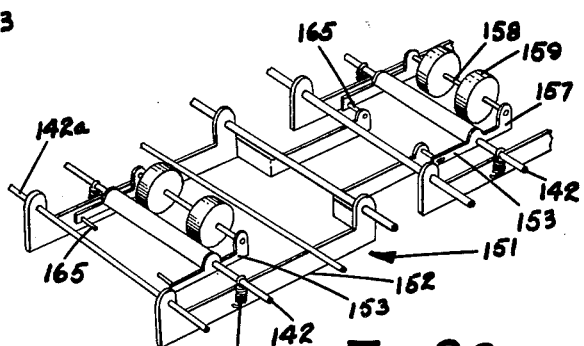

United States Patent Office 3,062,359
Patented Nov. 6, 1962

3,062,359
ACCUMULATOR CONVEYOR
Thomas C. McGow, Convent, N.J., and Norman C. Poel and Howard Olk, Grand Rapids, Mich., assignors to The Rapids-Standard Company, Inc., Grand Rapids, Mich., a corporation of Michigan
Filed Feb. 25, 1959, Ser. No. 795,435
29 Claims. (Cl. 198—160)

This invention relates to power driven conveyors and more particularly to such a conveyor having means specifically designed to permit articles to be accumulated on the conveyor track and remain stationary without necessitating stoppage of the conveyor's propelling member.

Conveyors capable of accumulating articles thereon without interference with the operation of the conveyor's propelling member have long been desirable. Over the years, many conveyors have been built having this objective in mind but such conveyors have fallen far short of having the necessary characteristics to produce satisfactory operation. Further, the pressing necessity for making equipment completely automatic has greatly increased the necessity for effective accumulating conveyors.

Accumulation occurs whenever the movement of articles on the conveyor is temporarily halted, causing the articles to pile up in abutting or close pack relationship in a particular zone of the conveyor. The problems resulting from a pile up or accumulation of articles have been particularly severe in the case of power operated conveyors. Such accumulations or close packing of articles occurs as the result of many causes. Some of these are intentional and others are accidental. Whenever a conveyor has a switch mechanism selecting the particular track to which articles are discharged or from which articles are received, a gate is normally provided to restrain temporarily the movement of articles. This may occur on the track then temporarily disconnected or on the main conveyor line during adjustment of the switch for track selection. This results in accumulation of the articles on the blocked conveyor track. Many conveyors have bridges to permit the conveyor to be opened where it crosses an aisle. The opening of such a bridge causes a temporary accumulation of articles moving along the conveyor. Sometimes an article becomes misaligned on the conveyor, resulting in a blockage of the flow of articles. Another cause of accidental accumulation is the presence on the conveyor of a damaged article resulting it its becoming snagged or anchored to some stationary part of the conveyor structure, thereby forming a blockage.

With the introduction of more completely automatic conveying equipment, it is often desirable to group articles in a zone, such as adjacent a machine to assure a continuous, adequate supply of the articles to the machine irrespective of fluctuations in the rate at which articles are moved along the conveyor to the machine. Another example is the accumulation of articles at a particular station where the articles will enter one by one from the conveyor but be removed only periodically in groups. This often occurs at a loading dock, such as for the purpose of accumulating an entire pallet or truck load of articles over a period of time. In this case the articles frequently remain on the conveyor until a predetermined quantity of articles have been moved into the accumulation zone ready for discharge or reloading. Sometimes conveyors provide grouping stations at which the articles are brought into close pack formation so that a given quantity or weight of articles may be moved as a group to a selected point of usage, such as along a spur track for loading, weighing or packaging.

In the past such zones of accumulation created a number of difficult problems in the conveying field. Whenever this accumulation occurred, excessive drag or tension was applied to the propelling member. On conveyors specifically designed to accumulate, this increased drag had to be provided for by the use of oversize prime movers and torque transmission elements in the power train. Where the accumulation accidentally occurred in equipment not designed for that purpose, the increased drag frequently resulted in excessive bearing wear, twisted shafts and burned out electrical motors. Even in equipment specifically designed to withstand the excessive drag incident to accumulation, the equipment had a shortened service life and the frequency and cost of service and repairs was materially increased. This was particularly true of propelling members such as belts. These belts are expensive and frequent replacement constitutes a material factor in the operating and maintenance cost of the conveyor.

The use of oversize prime movers and their operation under high propelling member loading conditions resulted in excessive power demand. The initial equipment must be substantially more expensive because it must be heavier, bulkier and more ruggedly constructed.

The adverse effects are incident not only to conveying equipment but also to the articles being moved on the conveyors. The abrasive effect of slippage between the articles and the propelling member results in wear and damage to the article. In the case of ornamented or decorated packages, the surfaces of the packages are frequently seriously mutilated. If this continues for any substantial period of time, the abrasion may sever the package, resulting in its opening and the spilling of its contents. In some cases the heat generated by this abrasive effect may result in fire.

This invention solves these problems by providing a conveyor specifically designed to accumulate articles without increasing the drag or tension on the propelling member. It provides an accumulator conveyor having many desirable characteristics, including dependability and simplicity. Its simplicity results in a lower initial cost, dependable operation and materially lowered service costs. The equipment is compact and comparatively lightweight. This invention provides an accumulator conveyor particularly adapted to automatic operation. It also provides equipment suitable for conversion of existing conveying equipment in whole or in part to accumulation operations.

These and other objects and advantages of this invention will be immediately understood by those acquainted with the design and use of materials handling equipment upon reading the following specification and the accompanying drawings.

In the drawings:

FIG. 1 is a diagrammatic view of an accumulator conveyor incorporating the principle of this invention, showing spaced or open accumulation;

FIG. 2 is a diagrammatic view of an accumulator conveyor incorporating the principles of this invention, showing close pack accumulation;

FIG. 3 is a fragmentary, plan view of a conveyor incorporating this invention;

FIG. 4 is a section, elevation view taken along the plane IV—IV of FIG. 3;

FIG. 7 is a fragmentary, plan view of a conveyor incorporating a further modified form of this invention;

FIG. 8 is a sectional, elevation view taken along the plane VIII—VIII of FIG. 7;

FIG. 9 is a sectional elevation view taken along the plane IX—IX of FIG. 7;

FIG. 10 is an oblique view of pressure control unit for the conveyor illustrated in FIGS. 8 and 9;

FIG. 11 is a fragmentary, plan view of a roller conveyor equipped with this invention;

FIG. 12 is a sectional, elevation view taken along the plane XII—XII of FIG. 11;

FIG. 13 is a sectional elevation view taken along the plane XIII—XIII of FIG. 12;

FIG. 14 is a fragmentary, oblique view of one of the sensing rollers for the conveyor illustrated in FIGS. 15 and 16;

FIG. 15 is a fragmentary plan view of a modified construction in which this invention is applied to roller conveyors;

FIG. 16 is a sectional, elevation view taken along the plane XVI—XVI of FIG. 15;

FIG. 17 is a sectional, elevation view taken along the same plane as FIG. 16 but showing a modified construction for the conveyor illustrated in FIG. 15;

FIG. 18 is a fragmentary, oblique view of a modified support for the sensing rollers of the conveyor construction illustrated in FIG. 17;

FIG. 19 is a fragmentary, oblique view of a portion of the pressure control units used in the conveyor construction illustrated in FIG. 15.

FIG. 20 is a fragmentary, oblique view of a portion of the pressure control units of the conveyor construction illustrated in FIG. 17;

FIG. 21 is an oblique view of one of the hanger links utilized in the conveyor illustrated in FIGS. 3 and 4;

FIG. 22 is an oblique view of one of the hanger links used in the conveyor construction illustrated in FIGS. 7 and 8;

FIG. 23 is an oblique view of one of the belt support hangers used in the conveyor construction illustrated in FIGS. 3 and 4;

FIG. 24 is an oblique view of one of the sensing wheel hangers used in the conveyor construction illustrated in FIGS. 3 and 4.

Figure 5:
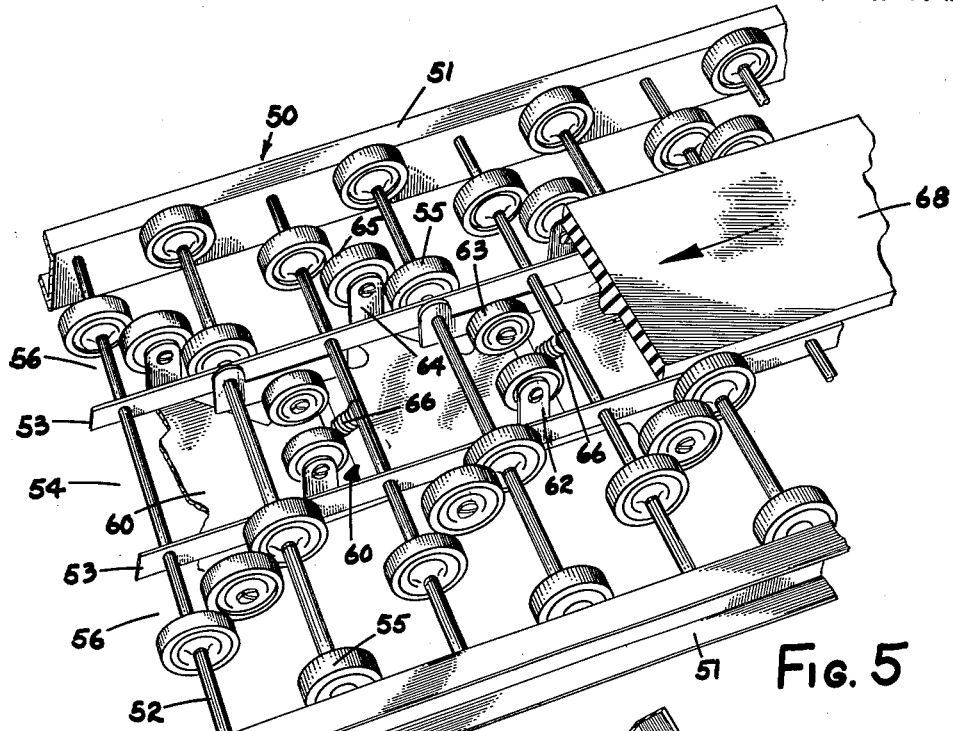
FIG. 5 is a fragmentary, oblique view of a conveyor incorporating a modified form of this invention.

In the execution of this invention there has been provided a conveyor having a narrow powered article propelling member flanked on each side by article supporting gravity conveyor tracks. The propelling member is supported by vertically movable means. On one or both sides of the propelling member, sensing elements are provided which project above the general plane of the propelling member and the gravity article supporting track. These are linked to the article supporting means whereby an article passing over them will depress them and simultaneously cause retraction or downward movement of the propelling member supporting means. The propelling member supporting means, the sensing means, together with the linkage between them, when tied together, constitute an integrated propelling member pressure control unit. The movement of this unit is sufficient to retract the propelling member below article engaging position so the article rests entirely on the gravity conveyor track.

The conveyor is so constructed that the portion of the propelling member retracted into article disengaging position is rearwardly of the area in which the article is sensed for activating the pressure control unit. Preferably this spacing is such that the engagement between the propelling member and the article resting on the sensing means is either not or is only partially affected but the engagement between the belt and the next article rearwardly thereof with respect to the movement of the belt is eliminated. Thus, this invention results in a propelling force being exerted upon the lead one of a group of closely packed articles with the propelling force being disengaged from all other adjacent articles rearwardly thereof until the lead article has moved on sufficiently to disengage the sensing means upon which it has been resting.

In the following description the term "rearwardly" shall be taken to mean upstream of the conveyor in the direction of movement of the propelling member, i.e., in the direction from which the articles are received and "forwardly" opposite thereof or in the direction of movement of the propelling member.

Referring specifically to the drawings, the numeral 1 refers to a conveyor bed having a pair of side rails 2 (FIGS. 3 and 4). The side rails 2 are parallel and spaced apart with the area between them spanned at spaced intervals by axles 3. The side rails may be of any suitable construction adequate to support the conveyor and its operating loads. Between the side rails 2 are a pair of intermediate rails 4. These are spaced apart and are parallel to the side rails 2. The spacing between the intermediate rails 4 forms a medial or central lane 5 for the propelling member 6. The propelling member 6 may be any of the numerous conventional mechanisms used for this purpose in the conveying art such as a rope, chain, V-belt or, as illustrated, a narrow flat belt. It is conceivable that other types of propelling members may be used. The propelling member 6 is narrow and may occupy only the very central portion of the medial lane 5 or it may be wide enough to occupy the entire medial lane. However, normally it does not extend much beyond the side margins of this lane. The propelling member 6 is powered by any suitable means, many types of drives suitable for this purpose being presently available on the market. The propelling member is driven in the direction of the arrow in FIG. 3. A conventional drive means is schematically illustrated in FIGS. 1 and 2 and includes an electric motor 45 as a prime mover. The torque of the motor 45 is transmitted to the belt through a suitable gear reducer 46, pulleys and belt or chair 47. This equipment is all conventional and forms no part of this invention other than to the extent that it is necessary that the propelling member be driven by suitable power means.

The medial lane 5 is flanked on each side by a low friction conveyor track generally designated by the numeral 7. The article supporting surfaces of the tracks 7 are formed by conveyor wheels 8 mounted for free rotation upon the axles 3. The wheels 8 are arranged in a pattern suitable for properly supporting articles moving along the conveyor bed. The particular pattern of wheels 8 chosen for this conveyor is not material to the invention, since the pattern will be governed by the character and weight of the articles for which the conveyor is to be used. The article supporting surfaces formed by the conveyor wheels 8 are preferably slightly below the plane of the top surface of the propelling member 6 when the propelling member is in its operating or elevated position.

At spaced intervals along the conveyor, support hangers 10 are mounted on selected ones of the axles 3. While it is not absolutely essential to the practice of this invention, it is preferable that the spacing between the support hangers 10 be uniform. The support hangers 10 are best seen in FIG. 23. Each has an axle hook 11 at its upper end, designed to seat over the axle so that the hanger depends from and is freely pivotable about the axle. To prevent accidental displacement of the hanger from the axle, the axle hook 11 is equipped with an ear 12 at each end. The ears are bent inwardly under the axle as a lock to prevent accidental dislodgment. The lower end of the support hanger 10 is equipped with a link hook 13 similar construction to that of the axle hook 11 but projecting in the opposite direction. Projecting outwardly from the main body of the support hanger, in a direction opposite to that of the axle hook 11, are a pair of laterally spaced arms 14, each having an upstanding ear 15. The upper ends of the ears 15 are connected by a shaft 16 on which is mounted a pair of freely rotatable conveyor wheels 17. The wheels may be held in selected spaced relationship by any suitable means such as by a tubular collar 18 seated about the shaft 16.

A hole 19 is provided in the lip of the link hook 13,

This hole serves as a means of securing one end of a tension spring 20 (FIGS. 3 and 4), the other end being secured about an adjacent axle 3 forwardly of the hanger. The bias of the spring pivots the support hanger 10 to the right, as illustrated in FIGS. 3 and 4, raising the conveyor wheels 17 into supporting position for the propelling member 6. The strength of the spring 20 is such that these wheels are held in elevated position even though they are supporting the weight of the belt or propelling member 6 and a small portion of the weight of the articles being transported by the propelling member. Upward pivotal movement of the hangers 10 is limited by contact between the outer ends of the arms 14 and the underside of the next forward axle 3 to which the spring 20 is attached. This prevents the spring 20 from raising the propelling member to a position where the entire weight of the articles would rest upon it rather than partially on the propelling member and partially on the conveyor tracks 7.

Forward of each belt support hanger 10, a pair of sensing hangers 30 are hung on one of the axles 3 in the track portion 7 of the conveyor bed. Preferably, two of the sensing hangers 30 are mounted on a single axle, one on each side of the propelling member 6. These are spaced laterally from the margins of the propelling member. The sensing hangers 30 are very similar in construction to the support hangers 10, having an axle hook 31 and a link hook 32 (FIG. 24). They are secured to the shaft 3 by deformable ears 33, similar to the ears 12 of the support hanger 10. Like the support hangers 10, they are freely pivotable about the axle. The sensing hangers 30 each have a pair of outwardly and upwardly extending arms 34, the upper ends of which mount a freely rotatable sensing wheel 35. The length of the arms 34 is such that when the hangers are in normal position, the upper surface of the sensing wheel 35 projects a short distance above the plane of the top surfaces of the conveyor wheels 8.

The pair of sensing hangers 30 mounted on a single axle 3 are operatively connected to a rearwardly positioned, single support hanger 10 by a link 36 (FIGS. 3, 4 and 21). The link 36 is a rigid loop having one end 37 seated in the link hook 13 of the support hanger and the opposite terminals 38 of the other end seated in the link hooks 32 of the associated pair of laterally aligned sensing hangers 30. The link 36 is so designed that it extends laterally outward in the area of engagement with the sensing hangers 30 and then is formed to extend downwardly under the hangers whereby its front portion 38a will not interfere with the operation of another support hanger 10 depending from the same axle 3 as the sensing hangers 30. Thus, a support hanger 10 together with a pair of sensing hangers 30 and a link 36 together form a single, integral pressure control unit, all parts of which move in unison, in one direction in response to the bias of the spring 20 and in the opposite direction in response to the weight of an article resting on or passing over the sensing hangers. Since the support hanger 10 and its associated sensing hangers 30 are tied together operatively by the link 36, the force of the spring 20 not only retains the support hanger in normally elevated position but maintains the sensing hangers in raised or article sensing position.

In the particular arrangement illustrated in FIG. 3, the support hanger 10 of one pressure control unit is mounted on the same axle 3 as the sensing hangers 30 of the next adjacent pressure control unit. Other spacing arrangements could be used in which the pressure control units were arranged in either an overlapping or a spaced pattern. As will be understood from the construction described, the pressure control units are so designed that they may be mounted on existing conveyors and are in the nature of attachments or conversion equipment. Thus, an entire conveyor system may be equipped with these units or only certain portions of the conveyor may be so equipped to create accumulation zones as is suggested by the absence of the sensing hangers 30 from the axle 3 of zone A in FIG. 3. A sufficient number of the support hangers 10 are provided to adequately support the propelling member so that it may function properly as a propelling member for the articles traveling along the conveyor. The conveyor wheels 17 of the support hangers 10 may be differently spaced on alternate hangers, as illustrated in FIG. 3, or identical spacing may be used on every hanger, depending on the operating characteristics desired.

As shown in FIG. 4, the return run 6a of the propelling member 6 is beneath the conveyor bed and is supported at spaced intervals by suitable conveyor wheels 40 mounted on shafts 41 extending between depending brackets 42. Any other suitable means of supporting the return run of the propelling member may be used within the scope of this invention.

Figure 6:
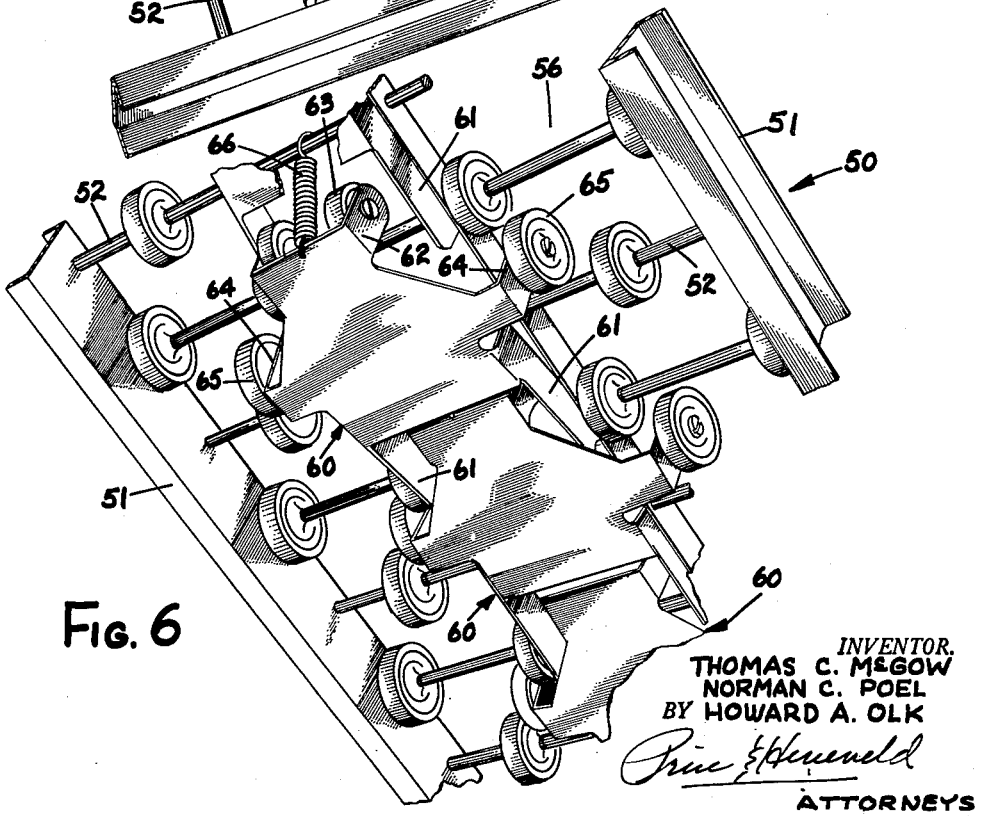
FIG. 6 is a fragmentary, oblique view of the underside of the conveyor construction illustrated in FIG. 5.

Referring to FIGS. 5 and 6, there is illustrated a different structure for carrying out the functional purposes of this invention. The conveyor 50 is quite similar to the conveyor 1 in general construction, having a pair of parallel, laterally spaced, side rails 51. A plurality of axles 52 spaced lengthwise of the conveyor extend between the side rails 51. Paralleling the side rails 51 are a pair of intermediate rails 53. These are laterally spaced to define a central or medial lane 54. The portions of the axles 52 lying on each side of the medial lane 54 are equipped with conveyor wheels 55. These are mounted on the axles 52 for low friction, free rotation and are arranged in any pattern suitable for transport of the particular articles for which the conveyor is designed. The portions of the conveyor bed 50 exterior of the medial lane 54 and having the conveyor wheels 55 constitute a pair of conveyor tracks 56 flanking the medial lane 54.

Mounted to the conveyor below the medial lane 54 are a plurality of rocker plates 60. Each of the rocker plates has a pair of forwardly extending hinge arms 61, the free ends of which are upwardly turned and apertured for seating about one of the axles 52. The opposite or rearward end of the rocker plate has a pair of upstanding support arms. These mount freely rotatable conveyor wheels 63. At a point intermediate the ends of the plate and substantially spaced both from the ends of the hinge arms 61 and from the support arms 62 are upstanding senser arms 64. The lateral spacing between the senser arms 64 is greater than that between either the hinge arms 61 or belt support arms 62 since both of the latter are designed to pass upwardly between the intermediate rails 53 within the medial lane 54 while the senser arms 64 are designed to pass upwardly in the conveyor track sections 56 exteriorly of the rails 53.

Each rocker plate 60 is pivotally swung about one of the axles 52 and thereby depends beneath the medial lane 54 of the conveyor bed. The rocker plate is held in raised or elevated position by a spring 66, one end of which is secured about one of the axles 52 and the other end is engaged to the rearward end of the rocker plate.

The rocker plates 60 may be arranged at any suitable spacing along the length of the conveyor so long as the supporting conveyor wheels 63 are spaced with sufficient frequency to adequately support the propelling member 68. Accordingly, there can be a substantial variation in their spacing from one conveyor to another. FIGS. 5 and 6 are to be considered merely illustrative of such spacing and to illustrate only one preferred arrangement. As shown in FIGS. 5 and 6, the adjacent rocker plates 60 overlap each other by having the supporting wheels 63 of one rocker plate positioned rearward of the axle about which the next adjacent rearward rocker plate 60 is pivoted. The rocker plates are so mounted that their supporting wheels are rearward of their pivot point. Therefore, articles being moved along the conveyor will engage the sensing wheels 65 after they have passed over the supporting wheels 63 of the same rocker plate.

Mounted for travel in the medial lane 54 is a power driven propelling member 68. The width of the propelling member may be no more than that of a rope, cable or chain or it may overlie the entire medial lane. It does not extend beyond the margins of the medial lane into the conveyor track section 56. Except at the ends where the propelling member 58 is supported by terminal pulleys (not illustrated), the propelling member is entirely supported by the conveyor wheels 63. The conveyor wheels are held in raised position by the contracted spring 66. The strength of the springs is such that they will support the propelling member 68 and a portion of the load of the articles being moved along the conveyor. In normal position, the springs 66 support the propelling member such that its top surface is level with or slightly above the plane of the top surfaces of the conveyor wheels 55 in the conveyor tracks 56.

The operation of the conveyor 50 is similar to the operation of the conveyor 1. Articles are removed along the conveyor by means of the propelling member 68 in the direction indicated by the arrows (FIG. 5). The articles rest partially on the propelling member and partially on the conveyor wheels 55. As they pass over the sensing wheels 65, the sensing wheels are depressed, pivoting the associated rocker plate 60 downwardly. Since this lowers the supporting wheels 63, secured to the particular rocker plate affected, the propelling member in the area above the particular supporting wheels affected drops into article disengaging position. In the particular arrangement shown in FIG. 5, it is intended hat the articles will overlie at least portions of two of the rocker plates 60. Thus, the lead end of the article will be engaged by the propelling member since it is supported in engaging position by a rocker plate, the sensing wheels of which have not been contacted by the article, whereas the belt will be released at the rearward end of the article.

FIGS. 7 through 10 illustrate a still different construction for this invention. The conveyor 70 has a pair of laterally spaced parallel side rails 71 with a plurality of axles 72 extending between them. The axles 72 are spaced lengthwise of the conveyor. The conveyor bed 70 has a central or medial lane 73 flanked on each side by gravity conveyor tracks 74. The medial lane 73 provides a path for the power driven propelling member 75 which move in the direction indicated by the arrow (FIG. 7). Articles being moved on the conveyor are supported partially on the propelling member 75 and partially on the top surfaces of the conveyor wheels 76 mounted for free rotation on the axles 72. The conveyor wheels 76 may be arranged in any pattern suitable for the particular conveyor so long as they are entirely omitted from the area of the medial lane 73 traveled by the propelling member 75. Mounted in the medial lane 73 are propelling member pressure control units 80 (FIG. 10). Each of the pressure control units 80 consists of a support member 81, a senser 82, and a link element 83 (FIGS. 7, 10 and 22). The link element 83 operatively joins the support member 81 and the senser member 82. For the sake of clarity in reading the drawings, the individual support assemblies in FIGS. 7 and 8 are designated 80, 80a, 80b, 80c, and 80d, and the associated components making up each such assembly are designated with similar letters.

The support hangers 81 are quite similar to the support hangers 10 illustrated in FIG. 3, having an axle hook 86 at the upper end and a pair of link hooks 87 at the lower end. The hangers 81 differ in that the central lower portion of the hanger is cut out at 88 to provide a clearance opening for the link 83. The hanger 110 for the senser 82 has a corresponding cutout. Each of the support hangers 81 has an opening to slidably receive the bolt 89. The other end of the bolt is locked to a spring shackle 90 by a pair of nuts 91. The spring shackle is pivotally seated over one of the axles 72 and the spacing of the opening in the spring hanger for the bolt 89 is substantially closer to the axle than the opening for the bolt in the support hanger 81. The importance of this will appear later. The bolt is surrounded by a coil spring 92 one end of which abuts against the back side of the support hanger 81 and the other end is compressed against an adjustment nut 93. The nut 93 may be adjusted along the bolt 89 to determine the amount of pressure exerted by the spring 92.

The support hangers 81 each have a pair of forwardly extending arms 100, the free ends of which are turned upwardly for mounting the shaft 101. Mounted for free rotation about the shaft are a pair of conveyor wheels 102. These are so spaced that they support propelling member 75. The wheels 102 are both mounted between the arms 100.

The hanger 110 for the senser unit 82 is practically identical to the hanger 81 for the support unit except that the hole for the bolt is omitted and the upwardly turned portions of the forward ends of the arms 111 are longer whereby the cross shaft 112 they mount is at a slightly higher position. The shaft 112 mounts a pair of senser wheels 113. These are mounted exteriorly of the arms 111 and are so spaced laterally that they are positioned beyond the margins of the propelling member 75. It will be noted that the diameter of the wheels 113 is greater that that of the wheels 102 and preferably they are the same diameter as the conveyor wheels 76 in the conveyor track sections 74 flanking the medial lane 73. The hangers 110 may be identical to the hangers 81 if wheels 113 of sufficient diameter are used to cause their top surfaces to project sufficient above the article supporting surface of the conveyor.

As in the conveyors 1 and 50, the senser units 82 are positioned forward of the supporting units 81. Thus, the effect of an article moving over a senser unit 82 is to lower the propelling member and release its contact with an article resting on the conveyor at a point substantially rearward of the senser unit. It will be noted that the construction shown substantially increases the spacing between the senser hanger and the support hanger of each pressure control unit by comparison with the construction illustrated in FIGS. 5 and 6. Thus, it is specifically adapted for larger packages or articles than is the unit in FIGS. 5 and 6. The pressure control units 80 are individually biased into propelling member supporting position by separate springs 92. Each pressure control unit can be adjusted to support the belt in the desired degree of force by manipulation of the nut 93 which controls the pressure exerted by the spring. The vertical position assumed by both the supporting unit 81 and the senser unit 82 may be adjusted by loosening locking nuts 91 and turning bolt 89 into or out of spring shackle 90.

When the senser hanger 82 is depressed by an article moving over it, this movement is transmitted to the support hanger 81 by the link 83, forcing the support hanger backwardly against the spring 92. Even though the spring shackle 90 has the apparent ability to rotate or pivot about the shaft 72 on which it is hung, this is not possible because of the difference in spacing of the point of attachment of the bolt 89 to the shackle and to the support hanger 81. The rearward winging movement of the support hanger quickly causes a bind which prevents pivotal movement of the shackle 90 thus resulting in compression of the spring. As in the other conveyors already described, the pressure control units are constructed to support the propelling member when in normal, unloaded position, at a height that is level or slightly above the plane of the tops of the conveyor wheels 76 forming the conveyor track sections 74. The return run 75a of the propelling member 75 is supported beneath the conveyor bed on depending brackets 115 and conveyor wheels 116.

The conveyor 120, illustrated in FIGS. 11, 12 and 13, is identical to the conveyor 70, illustrated in FIGS. 7 and 8, except for the substitution of rollers 121 for the conveyor wheels 76 in the conveyor tracks 122. The tracks 122 in location and function correspond to the tracks 74. The conveyor 120 has a bed defined by a pair of side rails 123 and a pair of inner rails 124 between which is defined a medial lane 125 for the power driven propelling member 126. The propelling member 126 moves in the direction indicated by the arrow (FIG. 11). The rollers 121 are mounted on shafts having one end secured to one of the side rails 123 and the other end secured to one of the inner rails 124. The substitution of rollers 121 for the conveyor wheels 76 in a conveyor of this type would be made whenever the character of the articles is such as to demand it. This change may be dictated by reason of the weight or construction of the articles. Some articles are of such construction that they do not move readily over widely spaced conveyor wheels but will move freely over roller type conveyors.

The means for supporting the propelling member 126 is correspondingly numbered and the above description of the same parts with relation to FIGS. 7, 8 and 10 is applied to this construction. The shafts 127 upon which the hangers 81, 90 and 110 are pivotally supported are specially provided for that purpose and at each end are secured to one of the inner rails 124. As in the case of the conveyor illustrated in FIGS. 7, 8 and 10, the movement of an article over one of the senser units 82 causes disengagement of the propelling member from an article at a point rearwardly thereof.

Since the shafts supporting both the rollers 121 and the pressure control units 80 are supported on axles which do not span the entire width of the conveyor, substantial loads are imposed on the inner rails 124. While these have been illustrated as fabricated of simple bar stock, it will be understood that stock shapes having substantially greater strength and rigidity may be substituted wherever strength requirements dictate such a change.

FIGS. 14, 15, 16 and 19 illustrate a different construction for applying this invention to roller conveyors. The conveyor bed 140 has a pair of laterally spaced side rails 141 between which extend shafts 142. The shafts are preferably uniformly spaced in groups of three lengths of the conveyor. Each shaft mounts a pair of rollers 143 and 143a for free rotation. The combined length of the rollers 142 and 142a is substantially less than that of the spacing between the side rails 141, creating a central or medial lane 144 extending lengthwise of the conveyor.

Certain of the rollers making up the conveyor tracks 145 are specially mounted. These are designated by the numerals 146 and 146a. Each roller pair 146 and 146a is mounted on a shaft 142a which, at its ends, is engaged in a vertically, elongated, slot 147 in each of the side rails 141 (FIG. 14.). This permits the rollers, together with their mounting shaft, a limited degree of vertical travel. The purpose of this will appear more fully hereinafter.

The propelling member 150, moving in a direction indicated by the arrow, is supported by pressure control units 151 (FIGS. 15, 16 and 19). Each of the pressure control units 151 consists of a rocker element 152 and a hanger element 153. The rocker elements 152 are pivotally mounted on one of the shafts 142 at a point intermediate therein. The forward end of each of the rocker units 152 terminates in an upturned ear 154 which is apertured to embrace one of the vertically movable shafts 142a. The opposite or rearward end of each rocker unit 152 has a pair of upstanding bumpers 155 which engage a crossbar 156 on the forward end of its associated hanger 153. The hanger 153 is pivotally mounted intermediate its ends on one of the shafts 142. On the end thereof remote from the crossbar 156, the hangers have a pair of upstanding wings 157 which mount a crosshaft 158. A pair of conveyor wheels are mounted on this cross shaft between the sides of the hanger.

Extending beneath the crosshaft 158 is a leaf spring 160, one end of which engages tightly over the adjacent shaft 142 about which the hanger 153 swings while the other end extends slidable over and beyond the next rearward shaft 142. The leaf spring 160 bears against the underside of the shaft 158 and biases it upwardly. The upstream end of the spring 160 is made freely slidable on the shaft 142 so that the central portion of the spring may be depressed when the shaft 158 is forced downwardly. The biasing effect of the spring 160 maintains the downstream end of the hanger 153 in elevated position. This, by reason of the contact between the crossbar 156 and the bumpers 155, pivots the rocker 152 about its supporting shaft, raising the shaft 142a into elevated position. In this position the top surfaces of the rollers 146 and 146a are above the plane of the top surfaces of the rollers 143 and 143a.

The action of the leaf spring 160 also holds the wheels 159 at a position where the top surface of the propelling member 150 is level with or slightly above the plane of the top surfaces of the rollers 143 but well below the top surface of the rollers 146 and 146a. Thus, as a package is propelled down the conveyor by the propelling member 150, it will ride partially on the propelling member 150 and partially on the rollers 143 and 143a. The rollers 146 and 146a are sensing rollers and upon contact by the article are depressed generally to the same level as the top surfaces of the rollers 143 and 143a. This pivots the rocket 152, forcing the upstream end of the hanger 153 upwardly, lowering the wheels 159. This permits the propelling member 150 to drop in that area, thus disengaging the propelling member from any article immediately above it. As soon as the article releases the senser rollers 146 and 146a, the biasing effect of the spring 160 restores the pressure control unit to its original position. Thus, the operation of the conveyor 140 is similar to the conveyors 1, 70 and 120.

FIGS. 17 and 20 illustrate a slightly modified form of the conveyor illustrated in FIGS. 15, 16 and 19. In this construction the rocker units 152 of the support assemblies 151 are identical. The support hangers 153 are the same except the crossbar 156 is eliminated and a positive attachment is made between the ends of the rocker unit 152 and the hanger unit 153 by means of the pins 165. The leaf spring 160 is replaced by a pair of tension springs 166. The upper end of the tension springs 166 are engaged about one of the shafts 142 and their lower ends are secured to the rocker units 152 adjacent the ends thereof, mounting the shaft 142a. Thus, the upward pull of the springs 166, by means of the positive linkage at pins 165 forces the conveyor wheels 159 upwardly into elevated, belt supporting position. The operation of this unit is identical to the unit illustrated in FIGS. 15, 16 and 19.

The same results may be obtained by locating the springs on the ends of the shafts 142a, as suggested in FIG. 18. In this case, the end of the shaft projects through the slot 147 in the side rails 141 and mounts a block 168. The block forms an abutment surface for the upper end of a compression spring 169, the lower end of which is seated upon the lower flange of the side rail 141. This arrangement will produce the same results as the use of the spring 166, illustrated in FIGS. 17 and 20.

All of the described embodiments of this invention will produce the same basic result. The result of the use of this invention is schematically illustrated in FIGS. 1 and 2. In these figures it is assumed that the propelling member 200 is being constantly operated in the direction indicated by the arrow.

Referring to the left end of FIG. 1, it is assumed that the first or lead article 201 is restrained from forward movement for some reason, such as the closed gate 202. Because at least a portion of the article 201 is resting on an area of the propelling member 200 which is supported by an elevated pressure control unit, the propelling member 200 applies a forward propelling force to this article. However, at the same time, the article 201 is resting upon one of the senser devices, thus causing the next rearward pressure control unit to be depressed, permitting the belt to drop. This forms a zone of disengagement 203 beneath the next adjacent article 201a. It will be noted that since article 201 is stationary, the position of the zone of disengagement 203 is also stationary and the article 201a will have no propelling force exerted upon it. At the same time, the zone of disengagement 203 is localized to the area of the article 201a. A secondary area of disengagement rearward of the article 201a is created by the fact that the article 201a is itself resting upon another senser unit, causing retraction of the next rearward one of the pressure control units.

The next adjacent article 201b is illustrated as being propelled by the propelling member 200 but is about to enter the zone of disengagement 203. As it does, its forward motion will cease. It will be noted that as the article 201b is moved along by the propelling member 200 it creates behind it a zone of disengagement 203a which zone travels with the article. This feature automatically prevents more than one article, of a closely packed group, at any one time from remaining stationary on the conveyor and in engagement with the propelling member while the propelling member is in motion. It also automatically spaces the articles on the conveyor one from another so that they move along in a uniform pattern as suggested by the position of the articles 201c and 201d. Each of these latter articles is followed by a zone of disengagement as indicated by zones 203b and 203c.

Where the pressure control units are of substantial length with respect to the articles, the articles, when brought into stationary close pack formation, will not come into contact with one another. Rather, they will remain uniformly spaced on the conveyor, as suggested by the spacing of the articles 201e through 201h. It will be noted that throughout the entire area of these articles, where they are stationary on the conveyor, the belt is depressed or retracted, forming an elongated, continuous zone of disengagement. The articles are removed from this storage zone one by one, as indicated by the article 201j which has just been engaged by the propelling member 200 after the article 201d had been moved sufficiently to withdraw its trailing zone of disengagement from beneath the article 201j.

The operation and function of the conveyor schematically illustrated in FIG. 2 is the same as that in FIG. 1 except in this case the length of the pressure control units is less than that of the articles whereby when the articles are moved into close pack formation they come to rest in contact with others, as suggested by the articles 201p through 201u. It will also be noted that the zones of disengagement which trail each of the articles in motion is considerably shorter and thus the articles travel along the conveyor at a much closer spacing.

It will be seen from this description that this invention provides a conveyor having very desirable accumulation characteristics. The load on the propelling member decreases under accumulation conditions. This is the exact opposite of the result produced by conventional equipment used for accumulation prior to this invention. Thus, the propelling member and its driving mechanism can be of substantially lighter construction, greatly reducing the weight, cost and size of the equipment. It makes feasible for the first time the use of conveyors as temporary or even long term storage means. This is particularly essential as the demand in conveyorization is increasingly in the direction of making the conveyor more automatic and capable of performing a number of functions which only a few years ago were considered to be so alien or contradictory to the function of transportation that the combination was considered impractical. Thus, the versatility of conveying equipment is greatly increased and the ability to adapt it to many uses not heretofore possible is but one of the many direct results of this invention. The invention also serves as a means for simply and automatically performing an entirely different function long desired in connection with conveyors under many circumstances. This is the automatic, uniform spacing of articles as they are moved along the conveyor. This invention automatically prevents articles from moving in packed groups with long gaps between groups of articles. If devices of this type are located periodically in a large conveyor system, they will automatically space the articles in a uniform pattern where they can be introduced one at a time to such automatic equipment as that for weight checking, marking, destination determination, closing and packaging. These are but a few examples of the types of automatic equipment which is now being combined with conveyors which will work far more satisfactorily and uniformly if the articles are delivered to the equipment at a uniform rate.

Having described a preferred embodiment of this invention, together with several modifications, it will be readily understood that various other modifications of this invention may be made without departing from the principle thereof. Such modifications are to be considered as included in the hereinafter appended claims unless these claims, by their language, expressly state otherwise.

We claim:

1. A conveyor for transporting and accumulating articles comprising: a track having article engaging propelling means characterized by a plurality of independent operating zones; said track having article support means cooperating with said propelling means; said propelling means when articles are in movement on said conveyor, supporting a portion of the weight of the articles; a plurality of independent sensing elements in said support means adapted to be actuated by articles moving along said support means; each said sensing elements being operatively connected to said propelling means for disengaging said propelling means from an article in one of said zones when said sensing means is actuated; each of said sensing elements being forward of and in a different zone from the one in which it is connected to said propelling means.

2. A conveyor for transporting and accumulating articles comprising: a track having article engaging propelling means and article supporting means; said propelling means characterized by a plurality of independent pressure control units each biased toward an article on the conveyor and normally maintaining engagement between the propelling means and an article resting thereon; a plurality of independent sensing elements adapted to be activated by articles moving along said conveyor; each of said sensing elements being operatively connected to one of said actuators forwardly thereof in the direction of movement of articles along said conveyor and spaced from the portion of said propelling means held in article engaging position by its associated actuator; each of said actuators being retracted to disengage said propelling means from an article thereon when its associated sensing element is activated.

3. A conveyor for transporting and accumulating articles comprising: a track having an endless article engaging propelling member flanked by an article support; a plurality of independent propelling member supporting elements spaced apart lengthwise of said conveyor; said supporting elements each being biased upwardly for holding a segment of said propelling member in article engaging position; a plurality of article sensing elements each separately connected to one of said supporting means, each adapted to be depressed by an article passing thereover and to lower its associated supporting element and the segment of the propelling member thereon into article disengaging position; each of said sensing elements being forward of its associated supporting element whereby each article passing along the conveyor causes only the segment of the propelling member behind the article to move into article disengaging position.

4. A conveyor for transporting and accumulating articles comprising: an article supporting surface; a power driven article propelling member for propelling articles along said supporting surface, a plurality of individual elements supporting said propelling member from beneath and spaced apart lengthwise of said conveyor; means adapted to be activated by an article being moved along said conveyor for successively and independently lowering each of said elements immediately rearwardly of the article as said article travels along said conveyor, the one of said means controlling the lowering of said propelling member beneath any one article being operatively independent of the one of said means activated by such one article.

5. In a conveyor adapted to transport and accumulate articles and having a low friction article supporting surface and a power driven propelling member for moving the articles over said supporting surface, the improvement in said conveyor comprising: a plurality of pressure control means arranged in spaced relationship along said conveyor; each of said pressure control means having a pressure element normally biasing a segment of said propelling member against articles on said conveyor and adapted to vary the position of said segment of said propelling member with relation to articles on said conveyor; each of said pressure control means having a sensing element operatively connected to the pressure element thereof and adapted to cause said pressure element to move and the segment of said propelling means associated therewith to disengage an article when said sensing element is activated by an article; said sensing element being spaced from and ahead of said pressure element and the segment of said propelling member controlled by said pressure element with respect to the direction of movement of said propelling member whereby one article releases the propelling force exerted by said propelling member on the next following article.

6. A conveyor for transporting and accumulating articles comprising: an article supporting surface; a power driven article propelling member adapted for frictional contact with articles on said conveyor for propelling the articles along said supporting surface, a plurality of vertically adjustable propelling member supporting elements each operatively independent and spaced apart lengthwise of said conveyor; a plurality of article sensing means each operatively associated with one of said supporting elements; each of said sensing means when activated by an article being adapted to cause its associated supporting element and the portion of said propelling member resting thereon to retract below article contacting position, said sensing means with respect to the direction of movement of said propelling member being forwardly of its associated supporting element and of the portion of said propelling member supported by said associated supporting element.

7. A conveyor for transporting and accumulating articles comprising: an article supporting surface; a power driven article propelling member for propelling articles along said supporting surface, a plurality of pressure control elements spaced lengthwise of said conveyor beneath and supporting said propelling member; each of said pressure control elements having an article contacting means and a propelling member contact means adapted to be lowered and to release a segment of said propelling member from article engagement; said propelling member contact means and article contacting means being adapted to be depressed simultaneously by the weight of an article passing over said article contacting means; said article contacting means being spaced ahead of said propelling member contacting means and the segment of said propelling member supported thereby in the direction of movement of said propelling member whereby said propelling member is lowered rearwardly of the article on said contacting means.

8. A conveyor for transporting and accumulating articles comprising: a power driven article propelling member for propelling articles along said conveyor, a plurality of pressure control elements spaced lengthwise of said conveyor beneath and supporting said propelling member; each of said supports having an article contacting means and a propelling member contact means adapted to be lowered and to release a segment of said propelling member from article engagement; said propelling member contact means and article contacting means being adapted to be depressed simultaneously by the weight of an article passing over said article contacting means; said article contacting means collectively forming an article supporting surface parallelling and cooperating with said propelling member; said article contacting means being spaced ahead of said propelling member contacting means and the segment of said propelling member supported by said contacting means in the direction of movement of said propelling member whereby said propelling member is lowered rearwardly of the article on said contacting means.

9. A conveyor for transporting and accumulating articles comprising: an article supporting surface; a power driven article propelling member for propelling articles along said supporting surface, a plurality of pressure control elements spaced lengthwise of said conveyor beneath and supporting said propelling member; each of said pressure control elements having an article contacting means and a propelling member contacting means adapted to be depressed simultaneously by the weight of an article passing over said article contacting means; each of said propelling member contacting means supporting a segment of said propelling member; said article contacting means being spaced ahead of said propelling member contacting means and the segment of said propelling member supported by said propelling member contacting means of the same pressure control element in the direction of movement of said propelling member, the propelling member contacting means of each of said elements being approximately aligned laterally of said conveyor with the article contacting means of the next rearward one of said elements.

10. A conveyor having a track characterized by a power driven propelling member flanked on both sides by article supporting means; a plurality of vertically movable independent pressure control elements each having a support unit beneath and in supporting relationship to a portion of said propelling member and means biasing each of said pressure control elements upwardly for holding said propelling member at least as high as the plane of said article supporting means; each of said pressure control elements having an article senser laterally spaced from said propelling member and adapted to move simultaneously with and in the same direction as its associated support unit; each of said sensers projecting above the plane of said article supporting surface and spaced ahead of its support unit and of the portion of said propelling members supported by said support unit in the direction of movement of said propelling member and adapted to be depressed by an article moving thereover for lowering its associated support unit and the portion of the propelling member supported by said support unit.

11. A conveyor as described in claim 10 wherein said support unit and said senser are each depending pivotable hangers and a link interconnecting said hangers for coordinated swinging movement.

12. A conveyor having a track characterized by a power driven propelling member flanked on both sides by article supporting means; a plurality of plates beneath and in supporting relationship to said propelling member; each of said plates being pivotally mounted at one end thereof; each of said plates having a propelling member supporting element on the other of its ends; an article contacting element projecting upwardly from a side of each of said plates intermediate said ends; said contacting element being spaced laterally from said propelling member; means biasing each of said plates upwardly for supporting said propelling member in article engaging position and said contacting element above the top surface of both said propelling member and said article supporting means; said pivotally mounted ends of said plates being forwardly of said supporting element with respect to the direction of movement of said propelling member.

13. A conveyor having a track characterized by a power driven propelling member flanked on both sides by article supporting means; a plurality of plates beneath and in supporting relationship to said propelling member; each of said plates being pivotally mounted at one end thereof; each of said plates having propelling member supporting elements on the other of its ends; article contacting elements projecting upwardly from each side of each of said plates intermediate said ends; said contacting elements being spaced laterally from said propelling member; means biasing each of said plates upwardly for supporting said propelling member in article engaging position and said contacting elements above the top surface of both said propelling member and said article supporting means; said pivotally mounted ends of said plates being forwardly of said supporting elements with respect to the direction of movement of said propelling member.

14. A conveyor for transporting and accumulating articles comprising: a frame; a plurality of shafts extending laterally of said conveyor and spaced apart lengthwise thereof; conveyor wheels mounted on said shafts and arranged to form a lane between said wheels extending lengthwise of said conveyor; a plurality of hangers each independently and pivotally mounted on selected ones of said shafts in said lane; each of said hangers having rotatable support members thereon; a powered endless propelling member in said lane seated on said support members and extending lengthwise of said conveyor; a sensing arm on each of said hangers forward of the support member of said hanger with respect to the direction of movement of said propelling member; said sensing arms being laterally spaced from said propelling member and having an article engaging means projecting above the surface of said conveyor wheels; each of said sensing arms being so connected to its associated hanger that both move simultaneously in the same direction whereby depression of one of said sensing arms by an article moving thereover retracts its associated support member and the portion of the propelling member above said support member to article disengaging position.

15. A conveyor for transporting and accumulating articles comprising: a frame; a plurality of shafts extending laterally of said conveyor and spaced apart lengthwise thereof; conveyor wheeels mounted on said shafts and arranged to form a lane between said wheels extending lengthwise of said conveyor; a plurality of hangers each independently and pivotally mounted on selected ones of said shafts in said line; each of said hangers having rotatable support members thereon; a powered endless propelling member in said lane seated on said support members and extending lengthwise of said conveyor; a pair of sensing arms on each of said hangers forward of the support member of said hanger with respect to the direction of movement of said propelling member; the sensing arms of each hanger being laterally spaced from said propelling member one on each side thereof and having an article engaging means projecting above the surface of said conveyor wheels; the sensing arms of each hanger so connected to the hanger that both move simultaneously in the same direction whereby depression of said sensing arms by an article moving thereover retracts their associated support members and the portion of the propelling member above said support members to article disengaging position.

16. A conveyor for transporting and accumulating articles comprising: a frame; a plurality of shafts extending laterally of said conveyor and spaced apart lengthwise thereof; conveyor wheels mounted on said shafts and arranged to form a lane between said wheels extending lengthwise of said conveyor; a plurality of first hangers each independently and pivotally mounted on selected ones of said shafts in said lane; each of said hangers having rotatable support members thereon; a powered endless propelling member in said lane seated on said support members and extending lengthwise of said conveyor; a plurality of second hangers each independently and pivotally mounted on selected ones of said shafts; said second hangers being spaced apart lengthwise of said conveyor and disposed laterally of said propelling members; each of said second hangers having an article engaging element projecting above the surface of said conveyor wheels; a link joining each of said first hangers to one of said second hangers for simultaneous movement in the same direction whereby depression of one of said second hangers by an article moving thereover retracts its associated first hanger and the portion of the propelling member above said second hanger to article disengaging position.

17. A conveyor for transporting and accumulating articles comprising: a frame; a plurality of shafts extending laterally of said conveyor and spaced apart lengthwise thereof; conveyor wheels mounted on said shafts and arranged to form a lane between said wheels extending lengthwise of said conveyor; a plurality of first hangers each independently and pivotally mounted on selected ones of said shafts in said lane; each of said hangers having rotatable support members thereon; a powered endless propelling member in said lane seated on said support members and extending lengthwise of said conveyor; a plurality of second hangers each independently and pivotally mounted on selected ones of said shafts; said second hangers being spaced apart lengthwise of said conveyor and disposed laterally of said propelling members; each of said second hangers having an article engaging element projecting above the surface of said conveyor wheels; a link joining each of said first hangers to one of said second hangers for simultaneous movement in the same direction; each of said first hangers being rearward of the second hanger to which it is operatively linked whereby depression of one of said second hangers by an article moving thereover retracts its associated first hanger and the portion of the propelling member rearward of said second hanger to form an article disengaging dip in said propelling member.

18. A conveyor for transporting and accumulating articles comprising: article engaging propelling means characterized by a plurality of independent operating zones; article support means cooperating with said propelling means; a plurality of independent sensing elements each adapted to be actuated by an article moving along said support means; each said sensing element being operatively connected to said propelling means and having biasing means for urging a segment of said propelling means into article propelling position and each said sensing element effecting movement of said propelling means to article disengaging position in one of said zones when said sensing means is actuated; each of said sensing elements being spaced from and in a different zone from the one in which it is connected to said propelling means.

19. A conveyor for transporting and accumulating articles comprising: an article carrying element; a power driven article propelling member for propelling articles along said carrying element, a plurality of individual control elements each controlling the position of a segment of said propelling member and arranged in successive and partially overlapping relationship lengthwise of said conveyor; the position of each segment of said propelling member being determinative of the propelling and non-propelling effect of such segment upon an article adjacent thereto; a biasing member urging each of said control elements against said propelling member and said propelling member into article propelling position; means adapted to be activated by an article being moved along said conveyor for successively and independently shifting each of said control elements and the associated segment of said propelling member into non-propelling position with respect to an article adjacent said segment as an article travels along said conveyor, the one of said means controlling the position of said propelling member with respect to any one article being operatively independent of the one of said means activated by such one article.

20. A conveyor having a low friction article transporting track characterized by a medial lane, an endless power driven conveying member in said medial lane adapted to make frictional contact with articles on said conveyor; a plurality of vertically movable operatively independent propelling member supporting units mounted on said track beneath said propelling member for floatingly supporting said propelling member; each of said propelling member supporting units supporting a segment of said propelling member; a plurality of article contacting elements, each adapted to shift upon contact with an article and each operatively connected to one of said propelling member supporting units for adjusting the vertical position thereof when said article contacting element is shifted by an article; means independently biasing each of said propelling member supporting units into raised position to hold said propelling member in raised article propelling position, said article contact element when shifted, lowering said propelling member supporting means and lowering the segment of said propelling member supported thereby to article disengaging position; each of said article contacting elements being spaced lengthwise of said conveyor from its operatively connected propelling member supporting unit.

21. A conveyor having an endless power driven article propelling member flanked by low friction article supporting surfaces; a plurality of propelling member supporting elements arranged successively along said conveyor beneath said propelling member, and each being operationally independent of the others; each of said propelling member supporting elements having a propelling member contacting portion; said propelling member throughout a substantial portion of its upper run resting entirely upon the contacting portions of said propelling member supporting elements; means individually urging each of said propelling member supporting elements upwardly for holding said propelling member in frictional contact with an article resting partially on said article supporting surface, said frictional contact being sufficient to cause said article to move along said conveyor with said propelling member; each of said propelling member supporting elements having a sensor portion positioned laterally of said propelling member and normally projecting above said article supporting surface for contact with an article moving along said conveyor; said propelling member contacting portion and said sensor portion of each propelling member supporting elements being operatively interconnected and adapted for simultaneous vertical travel whereby downward movement of said sensor portion will cause downward movement of said propelling member contacting portion; said sensor portion when an article rests upon it moving said propelling member contacting portion downwardly sufficiently to disengage the segment of said propelling member supported thereby from an article overlying said segment; said sensor portion of each propelling member supporting element being adjacent the propelling member contacting portion of a different propelling member supporting element.

22. A conveyor for transporting and accumlating articles comprising: a track having article engaging propelling means characterized by a plurality of independent operating zones; said track having article support means cooperating with said propelling means, said propelling means, when articles are in movement on said conveyor, supporting a portion of the weight of the articles; a plurality of independent sensing elements in said support means adapted to be actuated by articles moving along said support means; each said sensing elements being operatively connected to said propelling means for disengaging said propelling means from an article in one of said zones when said sensing means is actuated; each of said sensing elements being spaced from and in a different zone from the one in which it is connected to said propelling means.

23. A conveyor for transporting and accumulating articles comprising: said conveyor having article engaging propelling means characterized by a plurality of independent operating zones and a track having article support means cooperating with said propelling means, said propelling means normally making frictional contact with articles on said conveyor; a plurality of independent sensing elements adapted to be actuated by articles moving along said support means; each said sensing elements being operatively connected to said propelling means for disengaging said propelling means from an article in one of said zones when said sensing means is actuated; each of said sensing elements being spaced from and in a different zone from the one in which it is connected to said propelling means.

24. A conveyor comprising: an article supporting track; propelling means for moving articles along said track; said propelling means being characterized by the transmission of its propelling force to the articles by frictional contact; sensing means actuated by said articles as they are moved along said track; said track having control means operatively associated with said propelling means effecting engagement and disengagement between said propelling means and the articles for controlling the moving and stopping of the articles along said track; said control means being operatively connected to said sensing means and responsive thereto and when said sensing means is actuated effecting disengagement of said propelling means from those of the articles which are in a zone adjacent the article actuating said sensing means.

25. A conveyor comprising: an article supporting track; propelling means operatively associated with said track for moving articles along said track; said propelling means being characterized by the transmission of its propelling force to the articles by frictional contact; sensing means actuated by said articles as they are moved along said track; said track having control means operatively associated with said propelling means effecting engagement and disengagement between said propelling means and the articles for controlling the movement of the articles by said propelling means; said control means normally causing said propelling means to apply said propelling force to the articles; said control means being operatively connected to said sensing means and responsive thereto and when said sensing means is actuated effecting disengagement of said propelling means from an article adjacent the article actuating said sensing means.

26. A conveyor comprising: an article supporting track, propelling means for moving articles along said track; said propelling means being characterized by the transmission of its propelling force independently to each individual article by frictional contact with the article; a plurality of sensing means each actuated independently by each of said articles as they are moved along said track; said track having a plurality of control means operatively associated with said propelling means each effecting engagement and disengagement between said propelling means and the articles for controlling the movement of said articles by said propelling means; each of said control means being operatively connected to one of said sensing means and responsive thereto and when said sensing means is actuated effecting disengagement of said propelling means from an article adjacent the article actuating said sensing means.

27. A conveyor comprising: an article supporting track; propelling means for moving articles along said track; said propelling means being characterized by the transmission of its propelling force independently to each individual article by frictional contact with the article; a plurality of sensing means each actuated independently by each of said articles as they are moved along said track; said track having a plurality of control means operatively associated with said propelling means each effecting engagement and disengagement between said propelling means and the articles for controlling the movement of said articles by said propelling means; each of said control means normally causing said propelling means to apply said propelling force to said articles in a zone constituting the portion of said propelling means affected thereby; each of said control means being operatively connected to one of said sensing means and responsive thereto and when said sensing means is actuated effecting disengagement of said propelling means from an article in the one of said zones adjacent the article actuating said sensing means.

28. A conveyor comprising: an article supporting track; said track being characterized by a plurality of contiguous operating zones arranged in tandem therealong; propelling means for moving articles along said track, said propelling means being characterized by the transmission of its propelling force to the articles by frictional contact therewith; a plurality of sensing means each independently actuated by one of said articles as said articles are moved along said track; one of said sensing means being in each of said zones; said track having a plurality of control means operatively associated with said propelling means one in each of said zones and each effecting engagement and disengagement between said propelling means and those of said articles situated in the zone in which said control means is located; each of said control means being operatively connected to one of said sensing means in a different zone; each of said control means being responsive to its operatively connected sensing means and when said sensing means is actuated effecting disengagement of said propelling means from those of the articles which are situated in the zone in which said control means is located.

29. A conveyor comprising: an article supporting track; said track being characterized by a plurality of contiguous operating zones arranged in tandem therealong; propelling means for moving articles along said track, said propelling means being characterized by the transmission of its propelling force to the articles by frictional contact therewith; a plurality of sensing means each independently actuated by one of said articles as said articles are moved along said track; one of said sensing means being in each of said zones; said track having a plurality of control means operatively associated with said propelling means one in each of said zones and each effecting engagement and disengagement between said propelling means and those of said articles situated in the zone in which said control means is located; said control means having an element normally causing said propelling means to apply propelling force to said articles; each of said control means being operatively connected to one of said sensing means in a different zone; each of said control means being responsive to its operatively connected sensing means and when said sensing means is actuated effecting disengagement of said propelling means from those of the articles which are in the zone in which said control means is located.

References Cited in the file of this patent

UNITED STATES PATENTS

| | | |
|---|---|---|
| 1,209,021 | Phillips | Dec. 19, 1916 |
| 2,815,847 | Kinnicutt | Dec. 10, 1957 |

FOREIGN PATENTS

| | | |
|---|---|---|
| 657,265 | Great Britain | Sept. 12, 1951 |